(12) United States Patent
Nguyen (10) Patent No.: US 9,894,854 B2
(45) Date of Patent: *Feb. 20, 2018

(54) LIQUID STORAGE AND DELIVERY SYSTEM

(71) Applicant: Dung B. Nguyen, Mansfield, OH (US)

(72) Inventor: Dung B. Nguyen, Mansfield, OH (US)

(*) Notice: Subject to any disclaimer, the term of this patent is extended or adjusted under 35 U.S.C. 154(b) by 92 days.

This patent is subject to a terminal disclaimer.

(21) Appl. No.: 15/083,127

(22) Filed: Mar. 28, 2016

(65) Prior Publication Data

US 2016/0205879 A1    Jul. 21, 2016

Related U.S. Application Data

(63) Continuation of application No. 14/085,297, filed on Nov. 20, 2013, now Pat. No. 9,295,204.

(51) Int. Cl.
*A01G 25/00*      (2006.01)
*A01G 27/00*      (2006.01)
(Continued)

(52) U.S. Cl.
CPC .............. *A01G 27/005* (2013.01); *A01G 9/02* (2013.01); *A01G 25/16* (2013.01); *A01G 27/006* (2013.01);
(Continued)

(58) Field of Classification Search
CPC ......... Y10T 137/2761; Y10T 137/2774; Y10T 137/2788; Y10T 137/2836; A01G 27/005; A01G 27/006; A01G 27/008
See application file for complete search history.

(56) References Cited

U.S. PATENT DOCUMENTS 1,235,316 A    7/1917   Henderson
3,216,663 A   11/1965   Frampton et al.
(Continued)

FOREIGN PATENT DOCUMENTS

EP    0300377 A1    1/1989
EP    2529616 A1   12/2012
(Continued)

OTHER PUBLICATIONS

Buid a Self-Regulating, Automatic Plant Watering System with a Plastic Bottle and a Tray, http://lifehacker.com/5891194/build-a-self+regulating-plant-watering-system-with-a-plastic-bottle-and-a-tray, printed on Oct. 16, 2013.
(Continued)

*Primary Examiner* — Matthew W Jellett
(74) *Attorney, Agent, or Firm* — Ward Law Office LLC; Jacob M. Ward (57) ABSTRACT

A liquid storage and delivery system includes a reservoir and a storage container. The storage container has a main body with a hollow interior, and is configured to hold a reserve volume of the water. The main body has an upper wall and a lower wall. The hollow interior is disposed between the upper wall and the lower wall. A refill conduit is in communication with the hollow interior of the storage container. An air conduit is in communication with the hollow interior of the storage container and the reservoir. A liquid passage is in communication with the hollow interior of the storage container and the reservoir. The liquid passage is configured to deliver the water from the storage container to the reservoir. The liquid storage and delivery system is particularly useful for the watering of plants and animals.

18 Claims, 7 Drawing Sheets

(51) Int. Cl.
 *A01G 25/16* (2006.01)
 *F04F 10/00* (2006.01)
 *A01G 9/02* (2018.01)

(52) U.S. Cl.
 CPC ......... *F04F 10/00* (2013.01); *Y10T 137/2761* (2015.04); *Y10T 137/2788* (2015.04)

(56) References Cited

U.S. PATENT DOCUMENTS

| | | | |
|---|---|---|---|
| 3,856,205 | A | 12/1974 | Rohling |
| 4,347,687 | A | 9/1982 | Sibbel |
| 4,685,827 | A | 8/1987 | Sibbel |
| 4,846,206 | A | 7/1989 | Peterson |
| 4,991,345 | A | 2/1991 | Bloch |
| 5,440,835 | A | 8/1995 | Romo |
| 6,178,984 | B1 | 1/2001 | Amsellem |
| 6,497,071 | B1 | 12/2002 | Main et al. |
| 6,715,233 | B2 | 4/2004 | Lyon |
| 6,766,614 | B2 | 7/2004 | Teufel |
| 7,644,537 | B1 | 1/2010 | Hui |
| 8,408,229 | B2 | 4/2013 | Goldberg et al. |
| 9,295,204 | B2 | 3/2016 | Nguyen |
| 2006/0150486 | A1 | 7/2006 | Andu |
| 2007/0022660 | A1 | 2/2007 | Buitendag et al. |
| 2009/0056219 | A1 | 3/2009 | Csoke |
| 2011/0139080 | A1 | 6/2011 | Chumbley |
| 2011/0162272 | A1 | 7/2011 | Junkeer |
| 2013/0074405 | A1 | 3/2013 | Sohn |

FOREIGN PATENT DOCUMENTS

| | | |
|---|---|---|
| GB | 2470204 A | 11/2010 |
| JP | 2005006665 A | 1/2005 |
| JP | 2011139695 A | 7/2011 |
| WO | 2005095211 A1 | 10/2005 |

OTHER PUBLICATIONS

Automatic Self-watering System for Plants, http://frontgate.com/automatic-self-watering-system-for-plants/27421, printed on Oct. 16, 2013.

LIQUID STORAGE AND DELIVERY SYSTEM

CROSS-REFERENCE TO RELATED APPLICATIONS

This application is a continuation of U.S. patent application Ser. No. 14/085,297 filed on Nov. 20, 2013. The entire disclosure of the above application is hereby incorporated herein by reference.

FIELD OF THE INVENTION

The present disclosure relates to systems and methods for storing and dispensing liquids and, more particularly, to a system and method for watering plants and animals.

BACKGROUND OF THE INVENTION

A multitude of liquid storage and delivery systems are known in the art. One well known liquid storage and delivery system involves the use of a water tank, which is filled and then inverted and placed in a pan for delivering water from the tank to plants and animals. However, inverted tank systems have certain disadvantages. A refilling of the water tank can be difficult, and may result in undesirable spills. Due to practical considerations, such as the inability of a single person to lift and invert large water tanks when filled, the volume of the water tank in inverted tank systems has also been severely limited. Undesirably, inverted tanks systems are not scalable to commercial sizes.

Another known liquid storage and delivery system uses an electric metering system and at least one sensor. The electric liquid storage and delivery system is effective for delivering water to plants and animals on an as-needed basis. However, electric liquid storage and delivery systems can be costly to install and maintain. Since electric liquid storage and delivery systems employ moving parts, they can be subject to wear and malfunction over time. Moreover, electric liquid storage and delivery systems are unreliable during periods of power failure.

There is a need for a liquid storage and delivery system that is scalable to any size, does not have moving parts, and which does not rely on electricity for operation. Desirably, the liquid storage and delivery system is simple to fill and refill, and facilitates a long term delivery of water for plants and animals.

SUMMARY OF THE INVENTION

In concordance with the instant disclosure, a liquid storage and delivery system that is scalable to any size, does not have moving parts, does not rely on electricity for operation, is simple to fill and refill, and facilitates a long term delivery of water for plants and animals, is surprisingly discovered.

In one embodiment, a liquid storage and delivery system includes a reservoir and a storage container. The reservoir is configured to hold liquid, for example, water for use by plants and animals. The storage container has a main body with a hollow interior, and is configured to hold a reserve volume of the liquid. The main body has an upper wall and a lower wall. The hollow interior is disposed between the upper wall and the lower wall. A refill conduit is in communication with the hollow interior of the storage container. The refill conduit has a first end that is in communication with an outside of the storage container and a second end that is open to the hollow interior. The second end of the refill conduit is also disposed adjacent the lower wall of the storage container. An air conduit is in communication with the hollow interior of the storage container and the reservoir. The air conduit has a first end that is open to the hollow interior. The first end of the air conduit is also disposed adjacent the upper wall of the storage container. A second end of the air conduit is in communication to the reservoir. A liquid passage is in communication with the hollow interior of the storage container and the reservoir. The liquid passage is configured to deliver the liquid from the storage container to the reservoir.

In another embodiment, the refill conduit of the liquid storage and delivery system is disposed within the hollow interior of the main body, and is in communication with an opening formed in the upper wall of the storage container. The opening permits the filling and refilling of the storage container with the liquid. The air conduit is also disposed within the hollow interior of the main body and is in communication with a hole formed in a side wall of the storage container. The hole permits the flow of air out of the air conduit. The reservoir, the storage container, the refill conduit, and the air conduit may be formed as a one-piece, unitary assembly.

In a further embodiment, the main body of the storage container has an upper portion and a lower portion. The upper portion has the upper wall and the lower portion has the lower wall. The upper portion is selectively sealed with the lower portion to define the hollow interior of the storage container. The lower portion of the storage container is disposed in a pan that defines the reservoir.

In an illustrative embodiment, a liquid storage and delivery system according to the disclosure includes a storage container having a water refill conduit and an air conduit. The refill conduit is open at a top of the container and at a location within the container spaced apart from the bottom. The air conduit is open at the bottom of the container and at a location within the container spaced apart from the top. The air conduit is in communication with an open reservoir adjacent the container. The bottom of the refill conduit must always be below the top of the open reservoir, in order to avoid overspill. The container is also in communication with the open reservoir through a port. In one example, the port may be selectively closed with a plug. In another example, the port is in communication with an inverted-U shaped siphon conduit that is disposed within the storage container and has an open end spaced apart from the bottom of the storage container.

In operation with the plug example, the container is plugged and water is poured into the refill conduit until the container is mostly filled. The plug is then removed, which allows water to pour into the open reservoir. In operation with the siphon example, water is poured into the refill conduit without the need for a plug. Secondary tubes may also be placed in the open reservoir for siphoning of water from the open reservoir to other locations, for example, a plurality of potted plants.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

As used herein, relative terms such as "up," "down," "upper," "lower," "top," "bottom," "above," and "beneath" are made with reference to the direction of gravity, natural on Earth and other sufficiently massive bodies, or artificially created in slowly spinning dwelling structures in space, or in gradually accelerating or decelerating spacecrafts during interplanetary or interstellar voyages, where the ability to function without electricity is essential.

Figure 1:
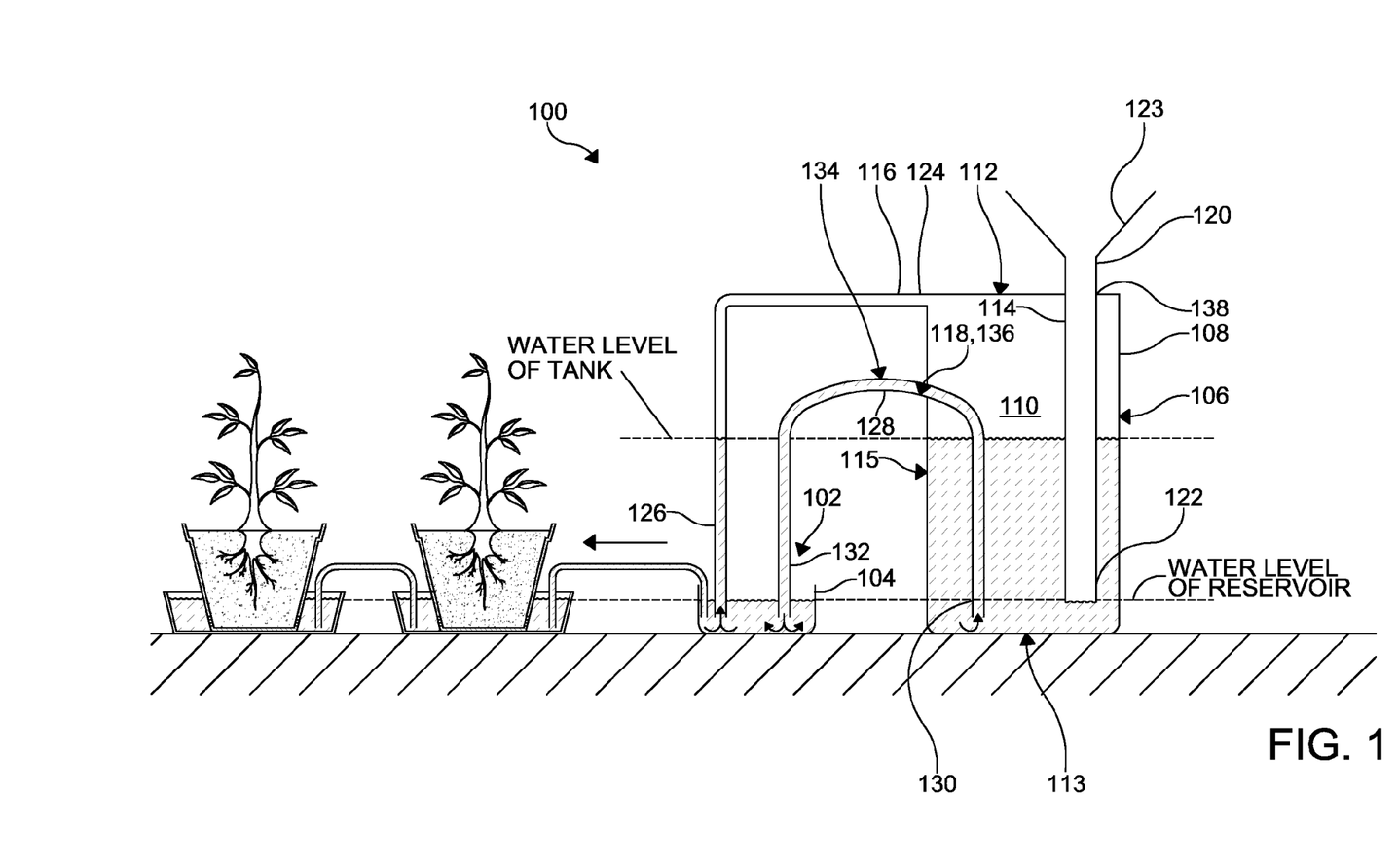
FIG. 1 illustrates a schematic, side elevational view of a liquid storage and delivery system according to one embodiment of the disclosure, and further shown in normal operation watering a plurality of potted plants.

An exemplary liquid storage and delivery system 100 according to the disclosure is depicted in FIG. 1. The liquid storage and delivery system 100 is configured to store and deliver liquid. One of ordinary skill in the art appreciates that, although the liquid storage and delivery system 100 is described primarily herein for storage and delivery of water as the liquid, other types of liquids such as wastewater, oils and solvents may also be used with the liquid storage and delivery system 100 of the present disclosure, as desired. Similarly, although described herein primarily with respect to the watering of plants and animals, it should be understood that the liquid storage and delivery system 100 of the present disclosure may be provided for any other purpose or end use where the long term storage and delivery of the liquid is contemplated.

The liquid storage and delivery system 100 may be formed from any material suitable for holding the liquid. As nonlimiting examples, the liquid storage and delivery system 100 may be formed from one of plastic, glass, metal, rubber, wood, and a composite material. Where a plastic is selected as the material for the liquid storage and delivery system 100, it may be particularly advantageous to injection mold the liquid storage and delivery system 100. In particular embodiments, depicted in FIGS. 2-3 and 5, for example, the liquid storage and delivery system 100 is shown formed from a transparent plastic or glass material for purposes of illustrating the interior structure of the liquid storage and delivery system. Opaque materials, or configurations in which part of the liquid storage and delivery system 100 is transparent and part is opaque, may also be used within the scope of the disclosure. A skilled artisan may select any other suitable materials and methods for manufacturing the liquid storage and delivery system 100, as desired.

With renewed reference to FIG. 1, the liquid storage and delivery system 100 includes a reservoir 102. The reservoir 102 is configured to hold the liquid. The reservoir 102 also permits a delivery of the liquid for an end use. Advantageously, the liquid storage and delivery system 100 is also able to maintain a constant level of the liquid in the reservoir 102 during normal operation. In particular embodiments, the reservoir 102 is defined by an open pan 104. The reservoir 102 may have an overflow drain (not shown) disposed adjacent an upper edge of the reservoir 102, in certain examples, to militate against an overflow condition. In other embodiments, the reservoir 102 may be defined by a depression in a surface, for example, in the ground or a platform, for the collection of the liquid. The reservoir 102 may also be substantially closed, for example, with a lid or the like. However, in examples where the reservoir 102 is closed, it should be understood that the reservoir 102 is not sealed in an air-tight manner, and permits ingress and egress of air to and from, respectively, the reservoir 102. This permits a normal operation of the liquid storage and delivery system 100, as described further herein.

The liquid storage and delivery system 100 also has a storage container 106 configured to hold a reserve volume of the liquid. The storage container 106 may have a main body 108 with a hollow interior 110. The main body 108 further has an upper wall 112, a lower wall 113, and at least one side wall 115. The upper wall 112, the lower wall 113, and the at least one side wall 115 may be formed from a single uninterrupted surface, for example, in the case of a spherical main body 108, or may be formed as separate but contiguous surfaces, for example, in the cases of a cylindrical main body 108 or a box-shaped main body 108. The hollow interior 110 is disposed between the upper wall 112 and the lower wall 113.

It should be appreciated that the walls of the main body 108 have a thickness sufficient to maintain an integrity of the main body 108 under partial vacuum or negative pressures that may occur with the normal operation of the liquid storage and delivery system 100. One of ordinary skill in the art may select suitable dimensions including wall thickness for the main body 108 of the storage container 106, as desired.

In a particular embodiment, as shown in FIG. 1, the lower wall 113 of the storage container 106 forms a base of the storage container 106, which is disposed on a surface such as a platform surface or a ground surface, as nonlimiting examples. In other embodiments shown in FIGS. 4a to 4c, for example, the lower wall 113 of the storage container 106 may be disposed in the open pan 104 of the reservoir 102, which in turn is disposed on the surface.

The liquid storage and delivery system 100 further includes a refill conduit 114, and air conduit 116, and a liquid passage 118. The refill conduit 114 is configured to fill or refill the storage container 106 with the liquid. The air conduit 116 is configured to discharge air under positive pressure from the storage container 106 during filling or refilling using the refill conduit 114, and to receive the liquid from the reservoir 102 under a negative pressure in the storage container 106 during normal operation. The liquid passage 118 is configured to deliver the liquid from the storage container 106 to the reservoir 102 during the normal operation.

As further illustrated FIG. 1, the refill conduit 114 is in communication with the hollow interior 110 of the storage container 106. The refill conduit 114 has a first end 120 that is in communication with an outside of the storage container 106. For example, the refill conduit 114 may be disposed through an opening 138 formed in the upper wall 112 of the storage container 106. The refill conduit has a second end 122 that is open to the hollow interior 110.

The first end 120 of the refill conduit 114 may be in the form of a funnel 123, as depicted in FIG. 1. As also shown in FIGS. 2 to 4c, the first end 120 may be configured to receive the funnel 123 for filling or refilling of the storage container 106 with the liquid. The first end 120 of the refill conduit 114 may also be configured to receive the liquid from other means, for example, a down spout of a home or commercial building. Other means for delivering the liquid to the first end 120 of the refill conduit 114 are also contemplated, and may be used within the scope of the present disclosure.

Referring now to FIG. 1, the second end 122 of the refill tube 114 may be disposed adjacent the lower wall of the storage container 106. It should be appreciated that the disposition of the second end 122 of the refill tube 114 is selected based on at least one of the size and the location of the reservoir 102. For the normal operation, and to militate against spillage of the liquid from the reservoir, the second end 122 of the refill tube 114 must be disposed beneath the uppermost edge of the reservoir 102. For example, a distance from the lower wall 113 of the storage container 106, and likewise the surface on which the lower wall 113 is disposed, to the second end 122 of the refill conduit 114 is less than a height of the reservoir 102. Consistent with this understanding, one of ordinary skill in the art may select an appropriate location for the second end 122 of the refill conduit 114, as desired.

The air conduit 116 of the liquid storage and delivery system 100 is in communication with the hollow interior 110 of the storage container 106 and the reservoir 102. The air conduit 116 has a first end 124 that is in communication with the hollow interior 110. For example, the first end 124 of the air conduit 116 may be open to the hollow interior 110 and disposed adjacent the upper wall 112 of the storage container 106. The air conduit 116 also has a second end 126 that is in communication with the reservoir 102. However, since the first end 124 of the air conduit 116 is disposed adjacent the upper wall 112 of the storage container 108, it should be appreciated that the air conduit 116 does not deliver the liquid to the reservoir 102 during the normal operation.

Similar to the air conduit 116, the liquid passage 118 is also in communication with the hollow interior 110 of the storage container 106 and the reservoir 102. However, in contrast to the air conduit 116, the liquid passage 118 is configured to deliver the liquid from the storage container 106 to the reservoir 102.

Figure 2:
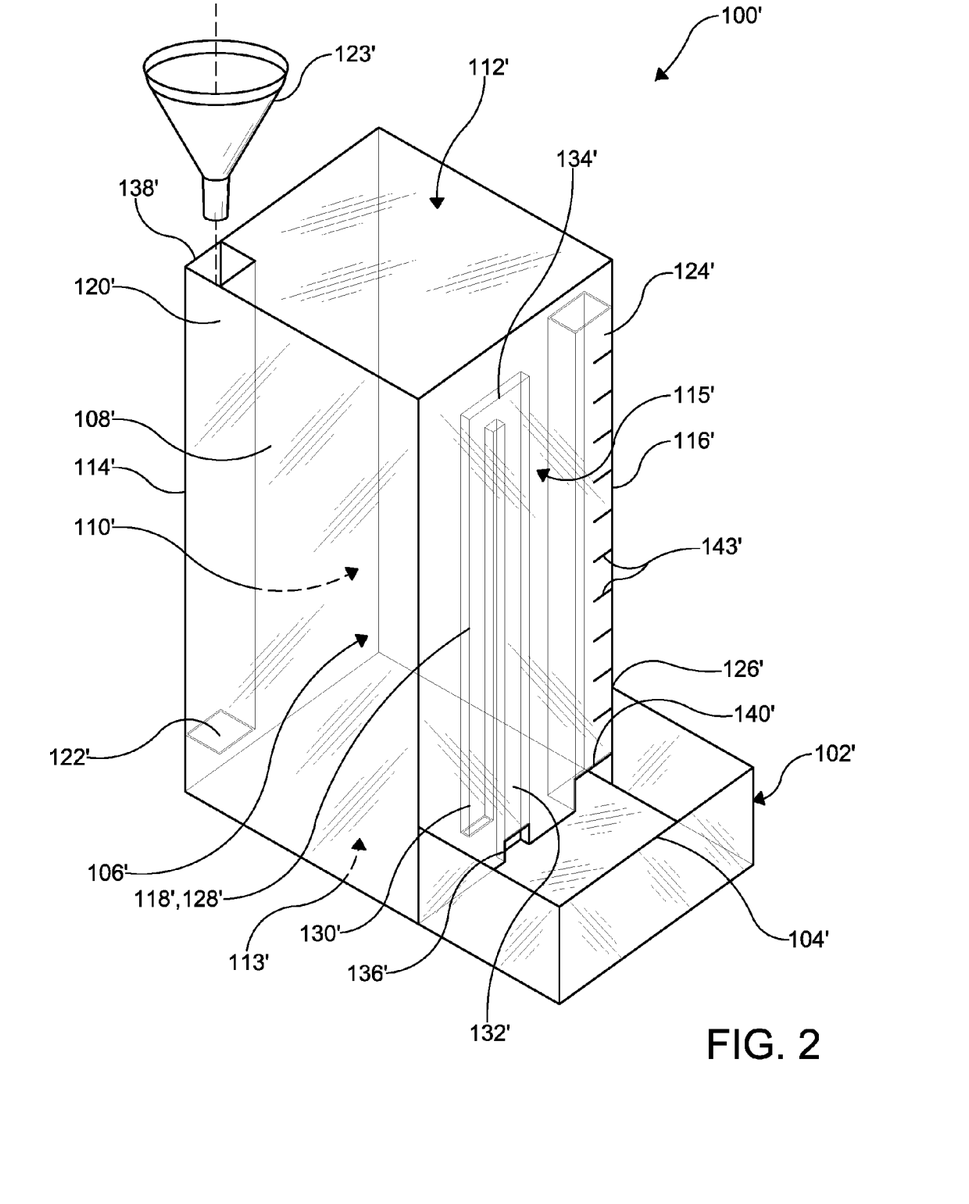
FIG. 2 is a side perspective view of a liquid storage and delivery system according to another embodiment of the disclosure, shown formed from a transparent material for purposes of illustrating an interior of the system, and also depicting a siphon conduit.
Figure 4A:
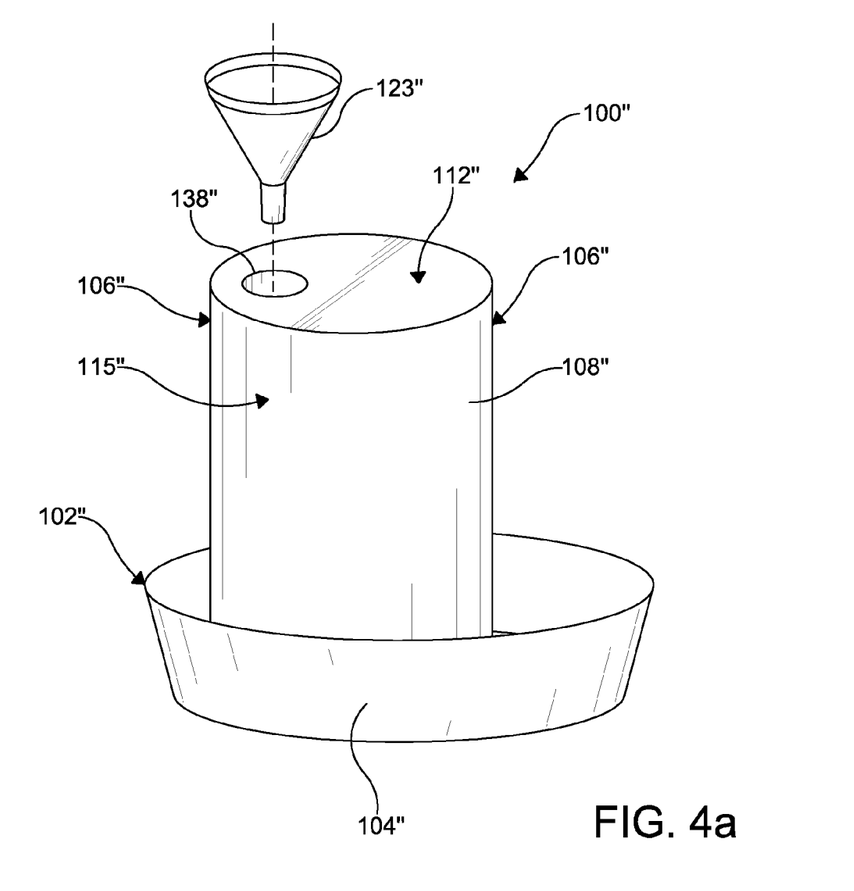
FIG. 4a is a side perspective view of a liquid storage and delivery system according to an additional embodiment of the disclosure, shown fully assembled.
Figure 4B:
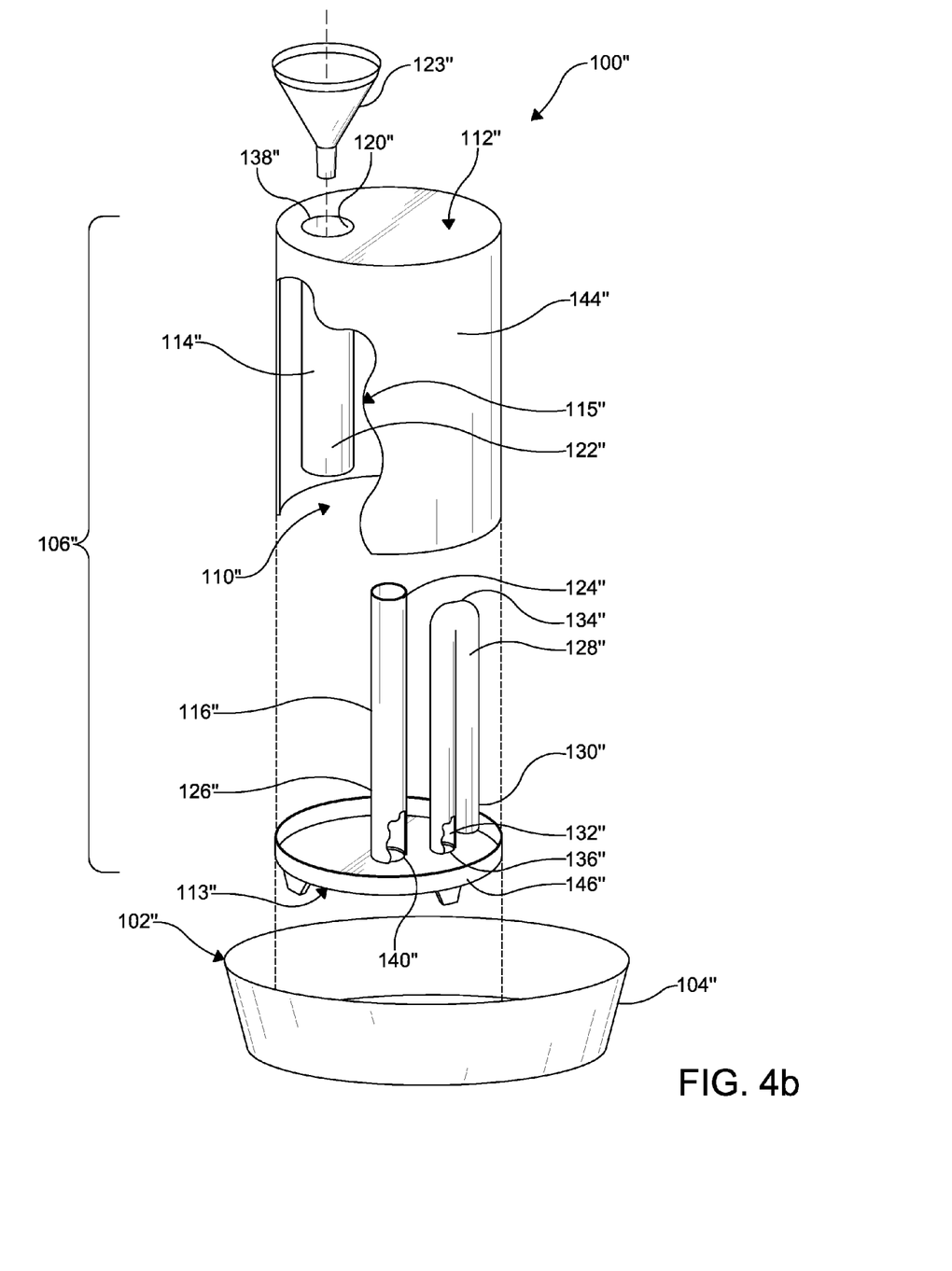
FIG. 4b is an exploded side perspective view of the liquid storage and delivery system shown in FIG. 4a, depicted with a siphon conduit and shown with portions of the storage container, the air conduit, and the siphon conduit removed.
Figure 5:
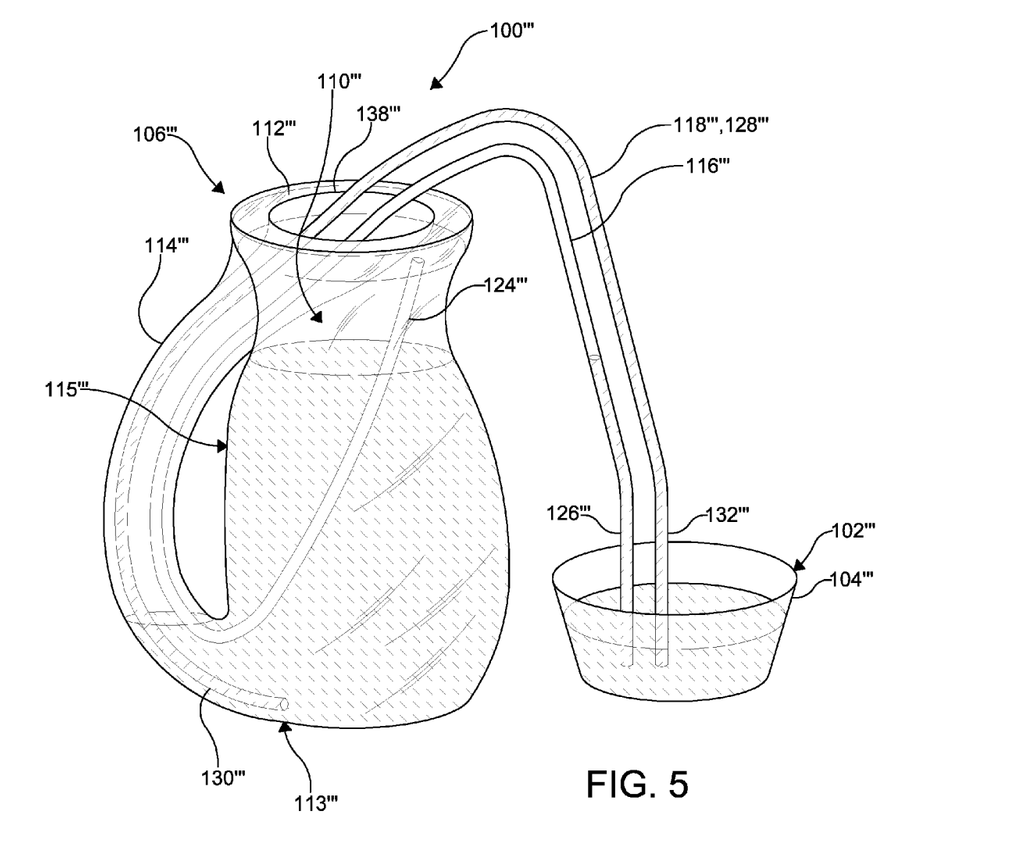
FIG. 5 is a side perspective view of a water system according to an auxiliary embodiment of the disclosure, shown with the refill conduit forming a handle of the storage container.

In certain embodiments, for example, as illustrated in FIGS. 1, 2, 4b, and 5, the liquid passage 118 is defined by a siphon conduit 128. As shown in FIGS. 1, 2, and 4b, the siphon conduit 128 may be self-siphoning. In another example as shown in FIG. 5, the siphon conduit 128 may require some manual intervention to begin the siphoning process. The siphon conduit 128 has a first end 130, a second end 132, and an apex 134. The apex 134 may be disposed at a bend of the siphon conduit 128 between the first end 130 and the second end 132, for example. The first end 130 of the siphon conduit 128 is open to the hollow interior 110 of the storage container 106. The second end 132 of the siphon conduit 128 is open to the reservoir 102. For proper operation of the liquid storage and delivery system 100, it should be appreciated that both the first end 130 and the second end 132 of the siphon conduit 128 are disposed beneath the apex 134 and beneath the second end 122 of the refill conduit 114.

With continued reference to FIG. 1, the siphon conduit 128 is disposed through a port 136 formed in the side wall 115 of the storage container 106. As illustrated, the port 136 may be formed in the side wall 115 in a location that permits a length of the siphon conduit between the first end 130 and the second end 132 to be disposed through the port 136. In this example, the location of the port 136 may support the apex 134 of the siphon conduit 128, and hold it above both the first end 130 and the second end 132 of the siphon conduit. Other locations for the port 136 may also be selected, as desired.

In operation, both the reservoir 102 and the storage container 106 may initially be provided empty. During an initial filling of the storage container 106, the liquid is introduced into the hollow interior 110 of the storage container 106 through the refill conduit 114. A level of the liquid in the storage container 106 then rises. The liquid also enters the siphon conduit 128, and forces air in the siphon conduit 128 to exit through the second end 132 of the siphon conduit into the reservoir 102. Likewise, during the initial filling, the air in the hollow interior 110 of the storage container 106 is forced out of the storage container 106 through the air conduit 116, and exits through the second end 126 of the air conduit 116 and into the reservoir 102.

When the level of the liquid in the storage container 106 is above the apex 134 of the siphon conduit 128, siphoning of the liquid into reservoir 102 through the self siphon conduit 128 begins. This causes the level of the liquid in the storage container 106 to fall, and create a partial vacuum or negative pressure in the storage container 106. The partial vacuum or negative pressure creates a suction at the second end 126 of the air conduit 116, which causes a portion of the liquid delivered to the reservoir 102 to be pulled into the air conduit 116.

The liquid is pulled into the air conduit 116 until it reaches a level that is the same as the level of the liquid in the storage container 106. Additionally, as the siphon conduit 128 continues to siphon the liquid into the reservoir 102, a level of the liquid in the refill conduit 114 begins to fall. This is due to the atmospheric pressure in the refill conduit 114 being greater than the pressure of the air in the hollow interior 110 of the storage container 106. Equilibrium is reached when the level of the liquid in the reservoir 102 is the same as the level in the storage container 106 at which the second end 122 of the refill conduit 114 terminates. The liquid storage and delivery system 100 is thereby readied for normal operation.

During normal operation of the liquid storage and delivery system 100, when the liquid is drawn out of the reservoir (for example, to be used to water potted plants as shown in FIG. 1), the level of the liquid in the reservoir will fall. The siphoning by the siphon conduit 128 from the storage container 106 then causes more partial vacuum or negative pressure in the storage container 106, which in turn causes further lowering of the level of the liquid in the refill conduit 114. This continues until air bubbles form at the second end 122 of the refill conduit 114. The air thereby enters the storage container 106 from the second end 122 of the refill conduit 114, permitting more of the liquid to be siphoned into reservoir 102. The level of the liquid in the reservoir 102 is thereby maintained at equilibrium throughout normal operation of the liquid storage and delivery system 100. The air that enters the storage container 106 from the second end 122 of the refill conduit 114 also causes the water level in the air conduit 116 to fall until it is at the same level as the water level in the storage container 106. The water level in the air conduit 116, therefore, serves as a level indication of the level in the storage container 106 at all times during normal operation of the liquid storage and delivery system 100.

When the storage container 106 begins to empty, for example, after prolonged use without refilling, the level of the liquid falls below the second end 122 of the refill conduit 114. This causes the air in the hollow interior 110 of the storage container 106 to become contiguous with the outside air. As more liquid is drawn from the reservoir 102 (to be used elsewhere), the levels of the liquid in the reservoir 102 and the storage container 106 drop until air enters the siphon conduit 128 through either the first end 130 or the second end 132 and the siphoning stops. At this point, the normal operation of the of the liquid storage and delivery system 100 ceases, and the nearly emptied storage tank 106 can be refilled as described hereinabove.

It should be appreciated that, due to the use of the siphon conduit 128, a further procedure is necessary in order to refill the storage container 106 when only partially emptied. In one example, air is injected, for example, using a syringe (not shown), into the second end 132 of the siphon conduit 128 in order to evacuate the liquid from the siphon conduit 128 and stop the siphoning process. Alternatively, where the siphon conduit 128 is sufficiently flexible (for example, rubber tubing) the second end 132 of the siphon conduit 128 can be lifted out of the reservoir 102 to empty the siphon conduit 128 of the liquid, and stop the siphoning. Additionally, the siphoning can be stopped by inserting a suitable plug (not shown) into the second end 132. Other means to stop the siphoning during refill include clamping the siphon conduit 128 along its length if it is sufficiently flexible or inserting a valve (not shown) along its length. Subsequent to the evacuation or emptying of the liquid from the siphon conduit 128, the storage container 106 can be refilled as described hereinabove.

Figure 3:
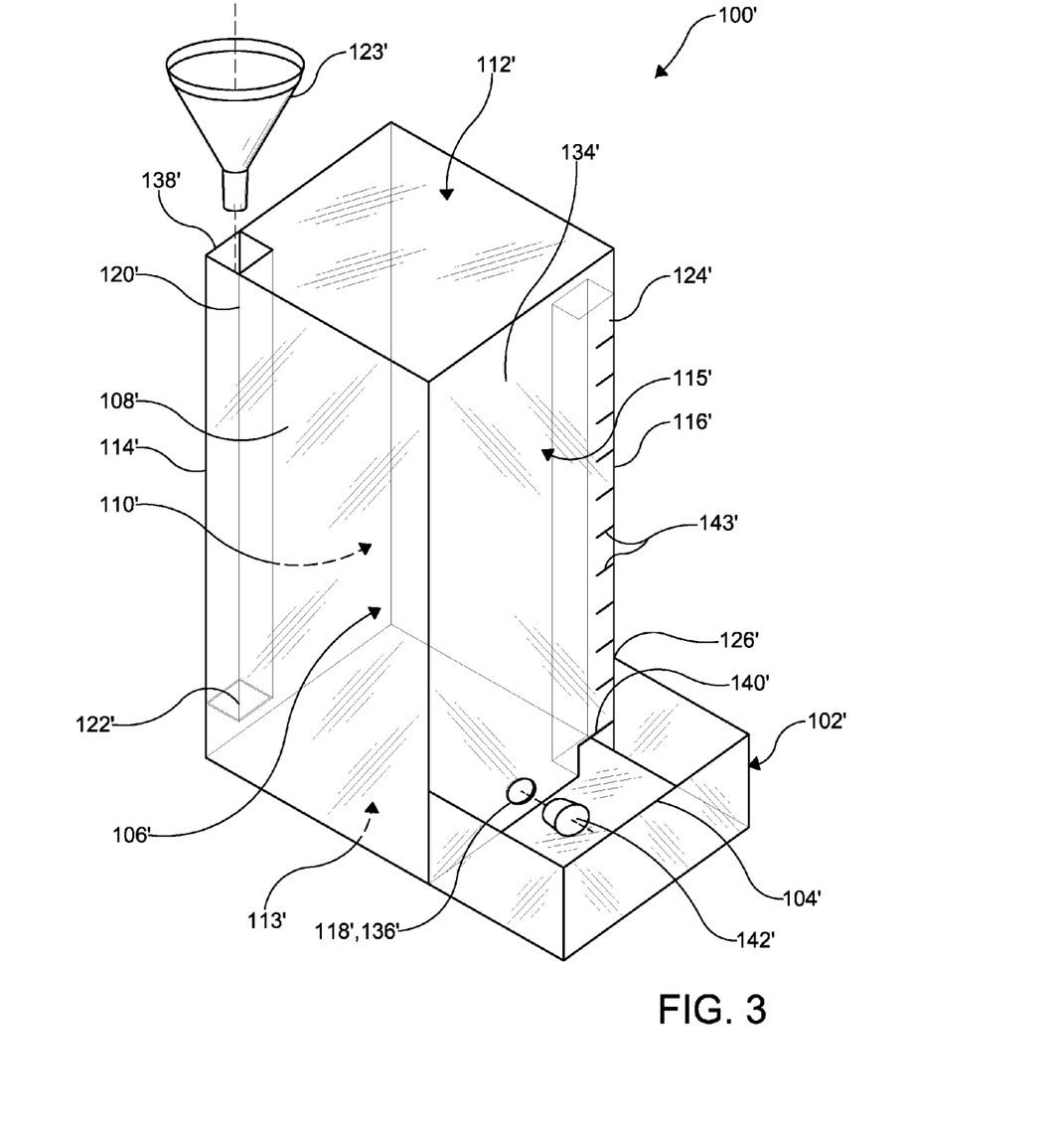
FIG. 3 is a side perspective view of a liquid storage and delivery system according to a further embodiment of the disclosure, shown formed from a transparent material for purposes of illustrating an interior of the system, and also depicting a plug and port arrangement.

FIGS. 2 to 3 illustrate the liquid storage and delivery system 100' according to other embodiments of the disclosure. For purpose of clarity, structure that is the same or related to that shown in FIG. 1 is identified in FIGS. 2 to 3 with a same reference number and a prime (') symbol.

Referring now to FIG. 2, the liquid storage and delivery system 100' of the present disclosure is shown, in which the reservoir 102', the storage container 106', the refill conduit 114', the air conduit 116', and the siphon conduit 128' are formed as a one-piece, unitary assembly. Each of the refill conduit 114', the air conduit 116', and the siphon conduit 128' may also be disposed entirely within the hollow interior 110' of the storage container 106'.

The first end 120' of the refill conduit 114' shown in FIG. 2 is in communication with the opening 138' formed in the upper wall 112' of the storage container 106'. The second end 122' of the refill conduit 114' is disposed adjacent and spaced apart from the lower wall 113' of the storage container 106'. The opening 138' permits the filling and refilling of the storage container 106' with the liquid, for example, via the funnel 123' or other suitable means.

The first end 124' of the air conduit is disposed adjacent and spaced apart from the upper wall 112' of the storage container 106'. The second end 126' of the air conduit 116' is in communication with a hole 140' formed in the side wall 115' of the storage container 106'. The hole 140' is formed adjacent the lower wall 113' of the storage container 106', and is open to the reservoir 102'. The hole 140' permits the flow of air and the liquid from the reservoir 102' out of or into the air conduit 116' during normal operation.

The first end 130' of the siphon conduit 128' is disposed adjacent the lower wall 113' of the storage container 106'. In addition to being disposed entirely within the hollow interior 110' of the storage container 106', the second end 132' of the siphon conduit 128' is also in communication with the port 136', as opposed to being disposed through the port 136 as shown in FIG. 1. The port 136' shown in FIG. 2 is formed in the side wall 115' of the storage container 106' adjacent the lower wall 113', and is open to the reservoir 102'. The disposition of the port 136' in this manner permits the flow of the liquid from the siphon conduit 128' to the reservoir 102'.

With reference to FIG. 3, the liquid storage and delivery system 100' without the siphon conduit 128' is shown. Where the siphon conduit 128' is not employed, the port 136' may serve alone as the liquid passage 118'. The port 136' may be formed in the side wall 115' of the storage container 106', and be open to the reservoir 102'. The port 136' permits the flow of the liquid from the hollow interior 110' of the storage container 106' to the reservoir 102', during the normal operation.

In operation, where the port 136' serves alone as the liquid passage 118', it should be appreciated that the port 136' must be selectively sealed, for example, with a removable plug 142', while the storage container 106' is being filled or refilled with the liquid. The removable plug may be in the form of a rubber stopper, for example, sized and shaped to press-fit and be securely retained in the port 136'. Upon completion of a filling or refilling operation, the port 136' is unsealed by pulling the removable plug 142', thereby permitting the liquid to flow from the storage container 106' to the reservoir 102'.

In yet another embodiment, it should be understood that it is possible to eliminate the plug 142' and obviate the need to stop the siphoning process during filling or refilling, thereby making the liquid storage and delivery system 100' easier to use. In this embodiment, the storage container 106' has a sufficiently high refill rate (R), for example, a gallon of fluid per minute, and a sufficiently low utilization rate (U), for example, ten drops of fluid per minute. The liquid passage 118', such as the port 136' or the second end 132' of the siphon conduit 128', is then made sufficiently small in order to restrict a reservoir supply rate (S), for example, to no more than sixty drops per minute. The plug 142' is thereby made unnecessary during filling or refilling, since there is no need to stop the siphoning process during the time required for the same because the small amount of siphoned fluid during that time period is insubstantial, in relation to the size of the reservoir 102', and will not cause any overflow. Other rates (R), (U), and (S) may be selected by one of ordinary skill in the art within the scope of the disclosure. A skilled artisan further understands that such an embodiment of the liquid storage and delivery system 100' is possible to operate, fill, and refill without any supervision when refilling is unpredictable and intermittent from rain, as a nonlimiting example.

In FIGS. 2 and 3, a plurality of indicia 143' are also shown. The indicia 143' are disposed on at least one of the main body 108' of the storage container 106' and the air conduit 116'. Where the portions of the main body 108' of the storage container 106' and the air conduit 116' underlying the indicia 143' are transparent, the indicia 143' are configured to identify the reserve volume of the liquid in the storage container 106'. To facilitate the reading of the reserve volume or liquid level, markings such as numbers and units, or words such as "Empty", "Full," or "Half Full," may be used as the indicia 143', or in addition to the indicia 143', as desired.

Figure 4C:
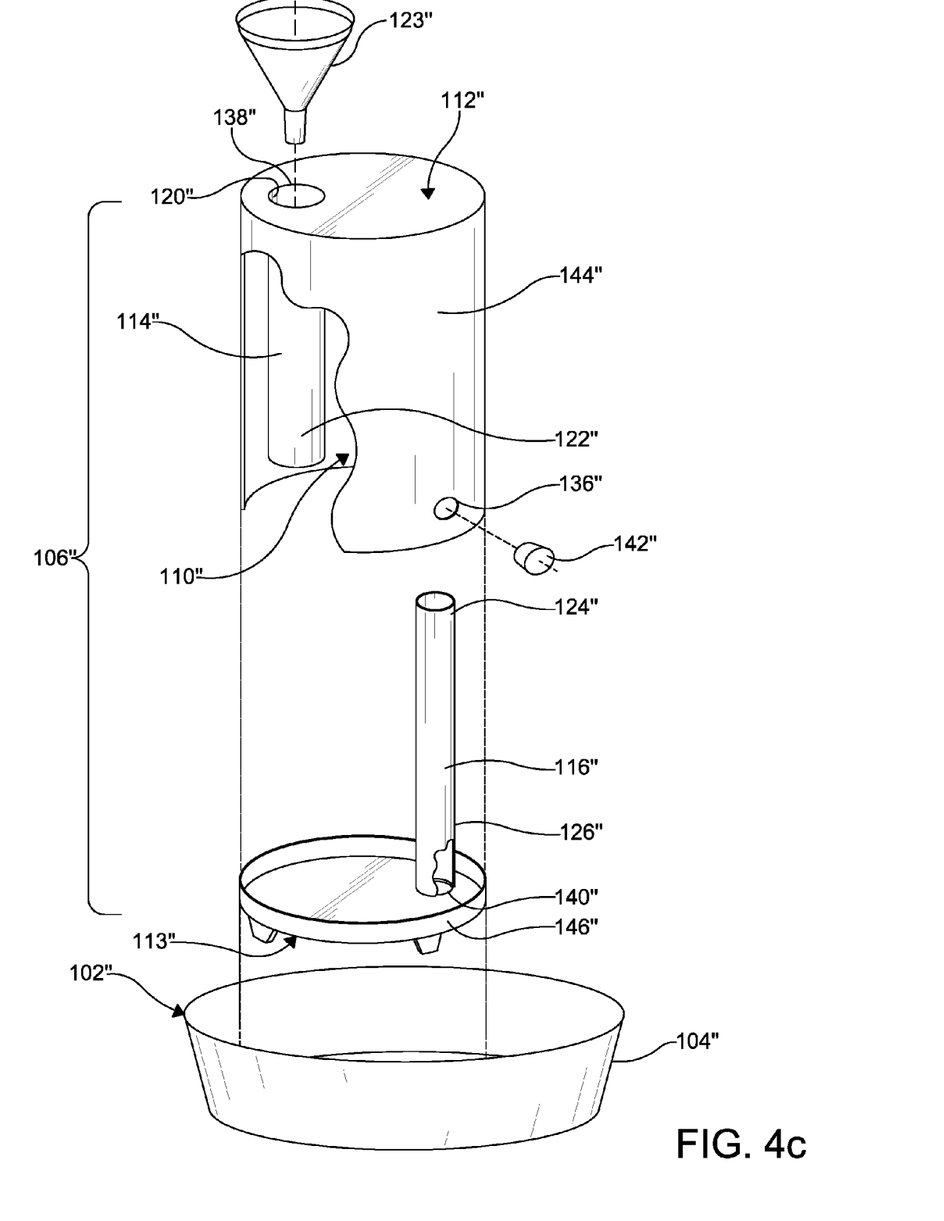
FIG. 4c is an exploded side perspective view of the liquid storage and delivery system shown in FIG. 4a, depicted with a plug and port arrangement, and shown with portions of the storage container and the air conduit removed.

FIGS. 4a to 4c illustrate the liquid storage and delivery system 100" according to additional embodiments of the disclosure. For purpose of clarity, structure that is the same or related to that shown in FIGS. 1 to 3 is identified in FIGS. 4a to 4c with a same reference number and a double-prime (") symbol.

The liquid storage and delivery system 100" shown in FIGS. 4a to 4c is a multi-part assembly, where the main body 108" of the storage container 106" includes an upper portion 144" and a lower portion 146". The upper portion 144" has the upper wall 112", and the lower portion 146" has the lower wall 113". The upper portion 144" is selectively sealed in a substantially fluid-tight manner with the lower portion 146", and thereby defines the hollow interior 110" of the storage container 106" in which the reserve volume of the liquid is stored.

In one example, the sealing of the upper portion 144" with the lower portion 146" may result from a press fitting of the upper portion 144" with the lower portion 146". In another example, each of the upper portion 144" and the lower portion 146" may be threaded, and cooperate with one another by a threaded engagement of their respective threads. One of ordinary skill in the art may select other suitable means for sealing the upper portion 144" with the lower portion 146", as desired.

As depicted in FIGS. 4a to 4c, the storage container 106" may be disposed in the reservoir 102". In the embodiment shown, the reservoir 102" is defined by the pan 104". However, it should be appreciated that the storage container 106" may alternatively be disposed in other surfaces or structures defining the reservoir 102", within the scope of the present disclosure.

Referring now to FIG. 4b, the refill conduit 114" may be coupled to and depend from the upper portion 144", and the air conduit 116" may be coupled to and supported by the lower portion 146". The first end 120" of the refill conduit 114" is in communication with the opening 138" formed in the upper wall 112" of the upper portion 144", which in turn is open to the outside of the storage container 106". Upon assembly, the second end 122" of the refill conduit 114" is disposed adjacent and spaced apart from the lower wall 113" of the lower portion 146". The second end 122" is thereby in communication with, and open to, the hollow interior 110" of the storage container 106".

The first end 124" of the air conduit 116" is also in communication with, and open to, the hollow interior 110" of the storage container 106". The second end 126" of the air conduit 116" is in communication with the hole 140", which in FIG. 4b is shown formed in the lower wall 113" of the lower portion 146" of the storage container 106".

In FIG. 4b, the siphon conduit 128" is further shown having the first end 130" in communication with, and open to, the hollow interior 110" of the storage container 106", when assembled. The second end 132" of the siphon conduit 128" is in communication with the port 136" formed in the lower wall 113" of the lower portion 146" of the storage container 106".

In FIG. 4c, the liquid storage and delivery system 100" is depicted without the use of the siphon conduit 128". Instead, the port 136" is formed in the upper portion 144" of the storage container 106", and is configured to deliver water from the storage container 106" into the reservoir 102" during the normal operation, when the storage container 106" is filled with the liquid. The port 136" may also be selectively sealed with the plug 142" during a filling or refilling operation of the storage container 106".

FIG. 5 illustrates the liquid storage and delivery system 100''' according to an auxiliary embodiment of the disclosure. For purpose of clarity, structure that is the same or related to that shown in FIGS. 1 to 4c is identified in FIG. 5 with a same reference number and a triple-prime (''') symbol.

In the liquid storage and delivery system 100''' shown in FIG. 5, the refill conduit 114''' forms a handle of the main body 108''' of the storage container 106'''. In particular, the refill conduit 114''' is disposed through the sidewall 115''' of the storage container 106''', through the hollow interior 110''' of the storage container 106''', and is in communication with the opening 138''' formed in the upper wall 112''' of the storage container 106'''.

As further shown in FIG. 5, each of the air conduit 116''' and the siphon conduit 128''' are disposed through the refill conduit 114'''. The first end 124''' of the air conduit 116''' terminates in, and is in communication with, the hollow interior 110''' near the upper wall 112''' of the storage container 106'''. The second end 126''' of the air conduit 116''' terminates in, and is in communication with, the reservoir 102'''. The first end 130''' of the siphon conduit 128''' terminates in, and is in communication with, the hollow interior 110''' near the lower wall 113''' of the storage container 106'''. The second end 132''' of the siphon conduit 128''' terminates in, and is in communication with, the reservoir 102'''.

Advantageously, the liquid storage and delivery system 100, 100', 100", 100''' of the present disclosure is scalable to nearly any size, and does not have moving parts. The liquid storage and delivery system 100, 100', 100", 100''' in a commercial size may be disposed adjacent a home or a commercial building and collect rainwater, for example, for distribution to plants found in the area round the home or the building. The liquid storage and delivery system 100, 100', 100", 100''' does not rely on electricity for operation, which contributes to a superior reliability compared to known systems. Moreover, the liquid storage and delivery system 100, 100', 100", 100''' of the present disclosure, in any size, is simple to fill, and more importantly, to refill. When used for the watering of plants and animals, the liquid storage and delivery system 100, 100', 100", 100''' of the present disclosure facilitates a long term and reliable delivery of water.

While certain representative embodiments and details have been shown for purposes of illustrating the invention, it will be apparent to those skilled in the art that various changes may be made without departing from the scope of the disclosure, which is further described in the following appended claims.

What is claimed is:

1. A liquid storage and delivery system, comprising:
   a reservoir configured to hold liquid, an upper edge of the reservoir disposed above a plane defined by an upper surface of the liquid where held in the reservoir;
   a storage container having a main body with a hollow interior that is configured to hold a reserve volume of the liquid, the main body having an upper wall and a lower wall, the hollow interior disposed between the upper wall and the lower wall;
   a refill conduit in communication with the hollow interior of the storage container, the refill conduit having a first end that is in communication with an outside of the storage container and a second end that is in communication with the hollow interior and disposed adjacent the lower wall of the storage container, the second end having an opening located at the plane and laterally spaced apart from the reservoir;

an air conduit in communication with the hollow interior of the storage container and the reservoir, the air conduit having a first end that is in communication with the hollow interior and disposed adjacent the upper wall of the storage container, and a second end that is in communication with the reservoir; and a liquid passage in communication with the hollow interior of the storage container and the reservoir, the liquid passage configured to deliver the liquid from the storage container to the reservoir, wherein the liquid passage is defined by a siphon conduit having a first end and a second end, the first end of the siphon conduit open to the hollow interior of the storage container and the second end of the siphon conduit open to the reservoir, and the second end of the siphon conduit is disposed in the reservoir below the plane.

2. The liquid storage and delivery system of claim 1, wherein an apex is disposed between the first end and the second end of the siphon conduit, the first end and the second end of the siphon conduit disposed beneath the apex.

3. The liquid storage and delivery system of claim 2, wherein the first end of the siphon conduit is disposed adjacent the lower wall of the storage container.

4. The liquid storage and delivery system of claim 3, wherein the siphon conduit is disposed through a side wall of the storage container.

5. The liquid storage and delivery system of claim 3, wherein each of the air conduit and the siphon conduit are disposed through the refill conduit.

6. The liquid storage and delivery system of claim 5, wherein the refill conduit forms a handle of the main body.

7. The liquid storage and delivery system of claim 1, wherein the refill conduit is disposed entirely within the hollow interior of the main body and is in communication with an opening formed in the upper wall of the storage container, the opening permitting a filling and refilling of the storage container with the liquid.

8. The liquid storage and delivery system of claim 1, wherein the air conduit is disposed entirely within the hollow interior of the main body and is in communication with a hole formed in one of the lower wall and a side wall of the storage container, the hole permitting the flow of air and the liquid from the reservoir out of or into the air conduit.

9. The liquid storage and delivery system of claim 3, wherein the siphon conduit is disposed entirely within the hollow interior of the storage container, and the second end of the siphon conduit is in communication with a port formed in one of the lower wall and a side wall of the storage container, the port permitting the flow of liquid from the siphon conduit to the reservoir.

10. The liquid storage and delivery system of claim 9, wherein the reservoir, the storage container, the refill conduit, the air conduit, and the siphon conduit are formed as a one-piece, unitary assembly.

11. The liquid storage and delivery system of claim 1, wherein the liquid passage is a port formed in a side wall of the storage container, the port permitting the flow of liquid from the hollow interior of the storage container to the reservoir.

12. The liquid storage and delivery system of claim 11, wherein the port is selectively sealed with a removable plug.

13. The liquid storage and delivery system of claim 11, wherein the reservoir, the storage container, the refill conduit, and the air conduit are formed as a one-piece, unitary assembly.

14. The liquid storage and delivery system of claim 1, wherein a distance from the lower wall of the storage container to the second end of the refill conduit is less than a height of the reservoir.

15. The liquid storage and delivery system of claim 1, wherein reservoir is separate and spaced apart from the storage container.

16. The liquid storage and delivery system of claim 1, wherein at least one of the main body of the storage container and the air conduit is transparent and has a plurality of indicia configured to identify the reserve volume of the liquid in the storage container.

17. The liquid storage and delivery system of claim 1, wherein the main body of the storage container includes an upper portion and a lower portion, the upper portion having the upper wall and the lower portion having the lower wall, the upper portion selectively sealed with the lower portion to define the hollow interior of the storage container, the refill conduit coupled to the upper portion and the air conduit coupled to the lower portion, and the reservoir is defined by a pan in which the lower portion of the main body of the storage container is disposed.

18. The liquid storage and delivery system of claim 1, further comprising at least one plant watering tube in communication with the reservoir and a planter for at least one plant, the at least one plant watering tube configured to deliver the liquid to the at least one plant.

* * * * *